United States Patent [19]

Maier et al.

[11] Patent Number: 4,613,261
[45] Date of Patent: Sep. 23, 1986

[54] ROUTER TOOL

[76] Inventors: Peter Maier, Gerokstrasse 1, 7311 Neidlingen; Erwin Kutscher, Hohenstaufenstr. 24, 733 Ebersbach-Bünzwangen; Rolf Knauer, Bergstrasse 9, 7300 Esslingen, all of Fed. Rep. of Germany

[21] Appl. No.: 749,103

[22] Filed: Jun. 26, 1985

[30] Foreign Application Priority Data

Jul. 4, 1984 [DE] Fed. Rep. of Germany ....... 3424500

[51] Int. Cl.$^4$ ............................................. B23C 9/00
[52] U.S. Cl. .............................. 409/137; 144/252 R; 408/710; 409/182
[58] Field of Search ........... 144/252 A, 252 R, 134 R, 144/136 R; 408/67, 241 R, 710; 409/137, 182

[56] References Cited

U.S. PATENT DOCUMENTS 2,943,655  7/1960  Pedersen et al. ............... 144/136 R
3,401,724  9/1968  Kreitz ............................. 144/252 R
4,011,792  3/1977  Davis ............................. 408/241 R

FOREIGN PATENT DOCUMENTS 615332   7/1935  Fed. Rep. of Germany ...... 144/252
679585   8/1939  Fed. Rep. of Germany ...... 144/252
1004795  3/1957  Fed. Rep. of Germany ...... 144/252

Primary Examiner—John Sipos
Assistant Examiner—Donald R. Studebaker
Attorney, Agent, or Firm—McGlew and Tuttle

[57] ABSTRACT

A chip collecting device for a routing tool is in the form of a hood or box having a wall surrounding part of the circumference of the routing bit. Chips thrown tangentially outwards from the bit are guided by the wall onto an upwardly sloping ramp when they pass into the suction current of a dust aspirating means that acts in an upward direction adjacent to the bit. The chip collecting hood or box is mounted on the lower side of an L-shaped stop in rails. The stop has a passage for the chips placed over the ramp.

10 Claims, 5 Drawing Figures

ROUTER TOOL

REFERENCE TO COPENDING APPLICATION

The present invention relates to improvements in the router described in the application Ser. No. 601,636, filed Apr. 18, 1984.

BACKGROUND OF THE INVENTION

The particular field of application of the invention is routers having a downwardly projecting routing or milling bit with means for drawing off dust produced by it.

Such a router has been described in the said application Ser. No. 601,636. It is made up of a downwardly facing router guide through which the router bit projects in a downward direction. The guide is in the form of a hollow body opening towards the router bit. Its internal space is in communication with the a vacuum connector for drawing off the chips etc. through a suction line. The downwardly projecting router bit may be provided with a chip collector to protect the user against the flying chips as they are thrown tangentially to the side by the router bit.

This previously proposed chip collector is not fully satisfactorily adapted for use with the dust abstracting system so that trapped chips are, if anything, only swept along by the aspirated air current to a small extent and some chips are left and have to be removed by hand, something that wastes time and may even be dangerous if carried out when the router bit is still running. This prior patent application does not completely fulfill its aim of making possible routing in a dust-free atmosphere.

SUMMARY OF THE PRESENT INVENTION

One object of the invention is to design a router having a level downardly facing guide through which the bit element of the router projects and a dust aspirating means placed at the same level as the guide or thereabove and with a chip collector, which has an improved form of dust aspirating means.

In order to effect this or other aims the chip collector of the present invention is so designed that it deflects the collected chips towards the dust aspirating means. More specifically, the chip collector may take the form of a hood that is located underneath the support guide and has a wall encompassing a part of the circumference of the router bit more or less in the circumferential direction. At a lower level than the lower end of the router bit there is a floor of the hood which adjoins a ramp leading to the dust aspirating means. Chips hurled by and away from the router bit impinge with a tangential velocity component against the wall along which they move to the ramp by which they are guided into the aspirating air current of the dust aspiratng means. This means that even those chips will be efficiently drawn off that collect in the chip collector.

Preferred forms of the invention are defined in the claims.

In accordance with one possible form of the invention the wall adjoins the edge of a base plate so that the chip collecting hood is open towards this edge and part of the hood that is enclosed by the wall is open at the same level as the base plate. Such a construction makes it possible to attach the chip collecting hood in a simple and convenient way on the guide support guide and to place it around the bit.

It is furthermore possible for the chip collecting hood to be mounted on the support guide so that it may be adjusted in a direction perpendicular to the axis of the router bit. This makes possible adaptation to different working conditions and more especially to different diameters of router bit. The adjustment of the hood may be changed until the best possible drawing off of the chips is ensured.

The chip collecting hood may be attached to a stop forming part of the router and which may be adjusted in its distance from the router bit. This part of the design profits from a sliding guide already provided next to the bit in the said prior U.S. patent application. This system is therefore particularly simple and may be produced at very little extra cost.

The chip collecting hood may be guided on the stop so that it slides along it. This makes it possible to adjust the position of the hood independently of the respective setting of the stop to obtain the most efficient removal of the chips.

The stop may be designed with a passage opening, located over the ramp, for the aspiration of chips. The passage opening may be through the holding plate and the flange of the stop, it extending over part of the height of the flange. As a further possibility the passage opening may have a straight front edge facing the position at which routing takes place and a curved back edge corresponding with the wall of the chip collecting hood. In the case of such a further development of the router, the chips are transferred via the passage opening in the stop. This makes certain that the motion of the chips is in no way hindered by the respective setting of the stop.

Further details and useful effects of the invention will be gathered from the following account of a working example thereof.

LIST OF THE SEVERAL VIEWS OF THE DRAWINGS

DETAILED ACCOUNT OF WORKING EXAMPLE OF THE INVENTION

Figure 1:
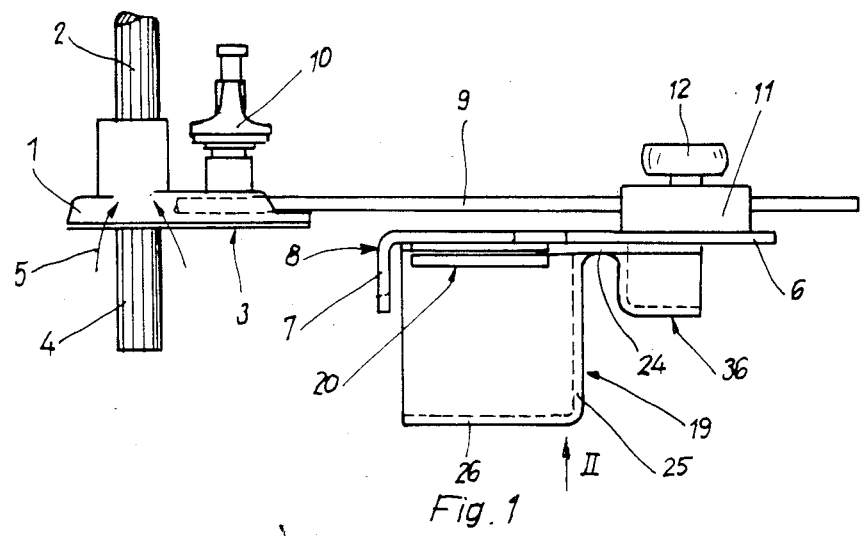
FIG. 1 is a side view of part of a routing tool with a downwardly projecting cutting bit as seen with the stop and the chip hood in a substantially non-operational position thereof.

On firstly referring to FIG. 1 the reader will be able to see part of a routing tool of the same design as described in full in the said prior U.S. patent application Ser. No. 601,636, dated Apr. 4, 1984. The routing tool with a downwardly projecting routing bit 2 possesses a level guide 1 with a downwardly facing surface 3 to be rested on the work and with a hole through which the vertical bit projects downwards. The lower end 4 of the routing bit 2 projects to a lower level than the guide surface 3. When the routing bit 2 is turning the end 4 will machine the work by routing or milling.

The routing tool is provided with a means for aspirating dust which is not illustrated in detail in the drawings. This means is placed at the same level as the support guide 1 or somewhat thereover and its function is to produce an aspirating air current so that chips produced at the end 4 of the bit will be removed. The support guide 1 itself may for this purpose take the form of a hollow structure, opening towards the bit 2, whose interior cavity may be joined up with a vacuum line. In this case the chips will make their way through an annular space around the bit 2, though the opening in the support guide 1, then through an annular space surrounding the bit into the interior of the support guide 1 and thence into the vacuum line. However, it is also possible for the dust to be drawn off through a number of separate ducts, which open a points near the bit 2 at the guide suface 3. The important point in connection with the invention is that adjacent to the projecting bit end 4 there is an upwardly directed aspirating air current, as is marked by the arrow 5.

A stop is attached to the support guide 1 for guiding the routing tool along the edge of a piece of work. Generally the stop has the form of right angle or letter L. It is made up of a base plate 6, which extends parallel to the support guide 1 and a downwardly projecting, upright flange 7 that is perpendicular to the base plate 6. The flange 7 is placed on the side of the base plate 6 that is nearer the bit 2. Its front side forms and abutment face 8 that is rested against the work. The stop may be moved in parallelism to the support guide 1 towards and away from the bit 2. To make this possible there are two guide rods 9 fixed to the support guide 1. These guide rods are parallel to each other and project from one side of the support guide 1. They are attached to the support guide so that they may be shifted in the direction of their length for adjustment. To make such shifting possible they are mounted in holes in the support guide 1 and may be clamped in position therein by clamps 10. The base plate 6 has two guide blocks 11 rigidly mounted thereon. These guide blocks are mounted on the top side of the base plate 6, that is to say on the side thereof facing away from the perpendicular flange 7. They have parallel through holes therein running in the intended direction of adjustment of the stop, one of each of such guide rods 9 being accommodated in each such hole. The guide blocks furthermore have respective threaded holes intersecting the through hole therein for its guide rod 9. A locking screw 12 is mounted in each such threaded hole so that it may be screwed tight on the guide rod 9. The stop is mounted on the parallel guide rods 9 by means of the guide blocks 11. After loosening the screws 12 it may be shifted along the guide rods 9 for adjustment. Furthermore there is an alternative or additional possibility of adjustment inasfar as when the stop is screwed tight in place the clamps 10 may be slackened off for adjustment of the rods 9 in relation to the guide 1. The guide blocks 11 are located on the part of the plate 6 furthest from the flange or the bit 2. They are made with such a height that the base plate 6 of the stop takes up a position at a small distance under the guide surface 3 of the support guide 1. Therefore there is a possibility of moving the stop along under the support guide 1.

Figure 2:
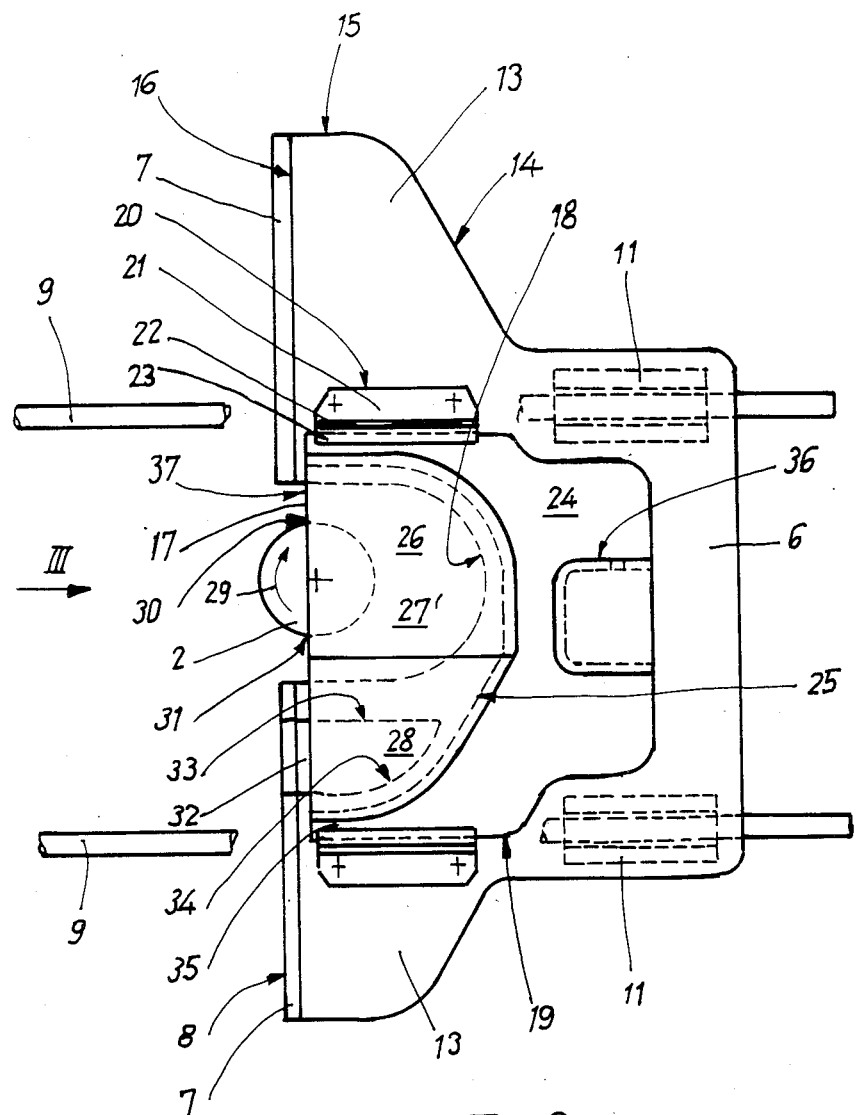
FIG. 2 shows the stop and the chip hood from below, i.e. looking in the direction II as marked in FIG. 1 and on a large scale.

Referring now to FIG. 2, it will be seen that the base plate 6 of the stop has a rectangular outline adjacent to the guide blocks. It becomes wider towards the flange 7 in the form of two lateral wings 13 whose oblique rear edges respectively merge with the rectangular part of the base plate 6. The arrangement of the two wings 13 is symmetrical Their lateral outer edges 15 run parallel to the guide rods 9 and their front edges 16 are at the same level as they are. THe upright flange 7 is formed by bending the front edges 16 when the base plate 6 has its greatest width.

The flange 7 is interrupted by a cutout 17 so that the flange has two sections. The cutout 17 extends like a slot along the base plate 6 about as far as a line joining the inner ends of the edges 14 of the wings. The back or right-hand inner edge 18 of the slot is arcuate, while the other end of the cutout 17 is open so that a gap is formed in the abutment face 8 dividing it into two equal parts. The cutout 17 is eccentric with respect to the rectangular part of the base plate 6 and the guide blocks 11 with the guide rods 9. This arrangement corresponds to the form of the chip collecting hood 19 which is fixed to the stop and which will be later described in more detail.

The cutout 17 makes it possible to move the stop in relation to the bit 2 so that the bit is within the cutout 17. The router bit 2 may for example assume the position to be seen in FIG. 2, in which its outer face is to a small extent outside the common plane of the aligned stop faces 8 of the flange 7. This amount of projection then determines the amount of material to be removed from the work, along which the router is moved while guided by the stop. It will be clear that the amount of material removed may be adjusted by adjustment of the stop on the guide rods 9. The arrangement of the guide rods is so selected that the the bit 2 takes up a position in the median plane of the cutout 17 and the width of the cutout 17 is chosen to be large enough for the maximum bit diameter.

Figure 4:
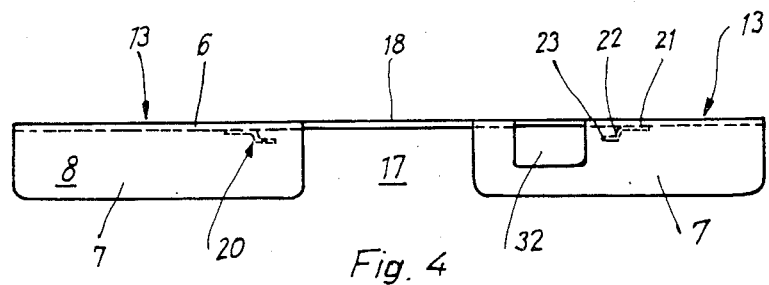
FIG. 4 is a further side view, this time of the stop and looking in the same direction III.

The chip collecting hood 19 noted earlier herein is attached to the lower face of the base plate 6 by rails 20 with the form to be seen in FIGS. 4 and 2. The rails 20 each have a first flange 21 firmly attached to the base plate 6, as for example by screws. Extending from each first flange 21 there is a further flange 22 running along the full length of the rails and bearing a third flange 23 which is plane-parallel to the first flange 21 but at a lower level than it. The rails 20 are aligned with the guide rods 9. They are placed on the two sides of the cutout 17 at unequal distances therefrom on the respective wings 13 and they are so mounted that their second flanges extend towards each other. Between the second flanges 23 and the lower face of the base plate 6 there is a gap in which the chip collecting hood 19 may be slid with a running fit.

The chip collecting hood 19 is held by the rails 20 on a base plate 24 and forms a downwardly projecting housing that encompasses the routing bit 2 and takes up the chips thrown from the bit in operation. The housing has a wall 25 which extends more or less in a circumferential direction in relation to the bit 2. It surrounds the section of the circumference of the bit 2 which is not directly engaged with the work, i.e. this part of the bit 2 is located within the cutout 17 in the stop, Furthermore the housing has a floor 26 which when the chip hood is placed in position is at a lower level than the bit 2. A portion 27 of the floor 26 adjacent to the bit 2 is flat and adjoins a ramp 28 running in an upward direction towards the dust aspirating means.

Figure 3:
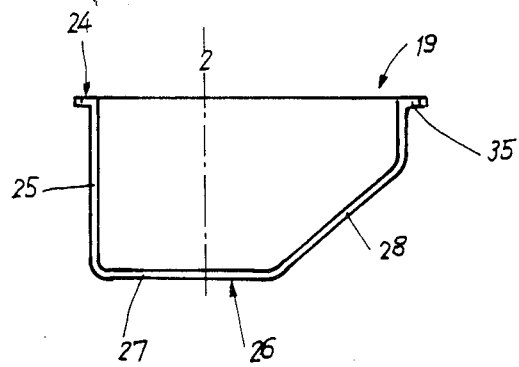
FIG. 3 is a side view of the chip hood looking in the direction III as marked in FIG. 2.

Referring to FIG. 2 it will be seen that the chip hood 19 is made wider adjacent to the ramp 28. The bit 2 runs eccentrically in the chip hood 19. Its direction of rotation is marked by the arrow 29. A point on the outer face of the bit 2 will at 30 enter the chip hood 19 and will leave it again at 31. The wider part of the housing with the ramp p28 is located at the exit point 31 from the chip hood 19. The ramp 28 runs upwards in the direction 29 of rotation of the bit 2 (see FIG. 3). In the illustrated working example of the invention it is flat and inclined at an angle of preferably 45°. However, the said ramp 28 might have another form as for example a curved or vaulted one, where it ascends in the direction of turning of the bit.

An account will now be given of the operation of the collecting hood 19. A given point on the outer face of the bit 2 at 30 will, after coming clear of the work to be routed, enter the chip collecting hood 19. Chips, dust and the like entrained by the bit will be moved tangentially with a circumferential velocity component. They will impinge on the curved wall 25 of the chip hood, where they will be deflected and then move on in the circumferential direction so that they will be taken up in the aspirating (or aspirated) air current of the dust collecting means. The chips, dust particles and the like collecting in the chip hood 19 are therefore more or less completely aspirated from the chip collecting hood.

The flight path of the chips is via the passage opening 32 in the stop in an upward direction. This opening is located over the wider part of the chip collecting hood 19 having the ramp 28. It is placed in one of the wings 13 of the stop and both parts of the base plate 6 (see FIG. 2) and also on the respective flange 7 (see FIG. 4). The passage opening 32 has a rectangular form at the flange 7. Unlike the cutout 17 it only extends for a part of the height of the flange, this increasing the strength of the structure. On the base plate 6 the passage opening 32 has a straight front edge 33 near the position of operation of the bit 2 and it furthermore has a curved rear edge 34 running towards the front edge at an acute angle. The rear edge 34 has a form following the curvature of the wall 25. This design therefore provides for a large aperture for the chips deflected on the ramp 28.

A further important point in connection with the operation of the chip collecting hood 19 of the invention is that there is a first deflecting surface extending more or less in the circumferential direction of the bit 2 and designed to deflect the chips onto an upwardly inclined second deflecting face. If the latter is designed in the form of a plane ramp 28, then it is best for it to be at an angle of 45° so that there is an overall deflection angle of 90° in the motion of the chips. As has been already mentioned, the second deflecting face may however also have a curved or vaulted form.

The flat floor 26 of the chip collecting hood 19 does not have any chip deflecting function. It forms a lower termination of the chip collecting hood 19 taking into account the maximum depth of the bit, it offering the possibility of simple cleaning. The chip collecting hood 19 in accordance with the invention is furthermore made with a small size. However it would in principle be fully possible for the housing of the chip collecting hood 19 to be fitted with a floor that would be slanting in all its parts (not illustrated).

The base plate 24 of the chip collecting hood 19 has two narrow lips 35 which fit between the rails 20. Behind the housing the base plate 24 becomes smaller to form a respective step with an oblique form of edge. On the corresponding base plate section there is a projection 36, serving as a handle, behind the housing. This projection is not connected with the housing, does not have any chip deflecting function and is irrelevant as regards the function of the chip collecting hood 19.

The housing of the chip collecting hood 19 is mounted on a front edge 37 of the base plate 24. Its curved wall 26 begins and ends at this front edge 37 so that the chip collecting hood 19 opens towards this front edge 37. The inner part, encompassed by the wall 25, is open at the level of the base plate 24. The bit may therefore freely extend downwards into the housing and the aspirating air current effective adjacent to the bit 2 is able to convey chips directly upwards as well. The chips then make their way through the opening 17 in the stop.

The chip collecting hood 19 may be shifted in position in the length direction of the guide rods 9, that is to say perpendicularly in relation to the axis of the bit 2. First the chip collecting hood 19 is entrained as well if the complete stop is displaced on the guide rods 9 in order to effect adaptation to a new size of routing bit 2 or in order to change the depth of routing of the bit along the work. Furthermore the chip collecting hood 19 is mounted so that it may shift in the rails 20 in relation to the stop, the amount of play for motion towards the bit 2 being limited by an abutment on the flange 7. It is therefore possible to adjust the position of the chip collecting hood 19 in relation to the stop so that there is optimum removal and aspiration of the chips. Furthermore the chip collecting hood 19 may be very easily detached from the stop and cleaned.

Figure 5:
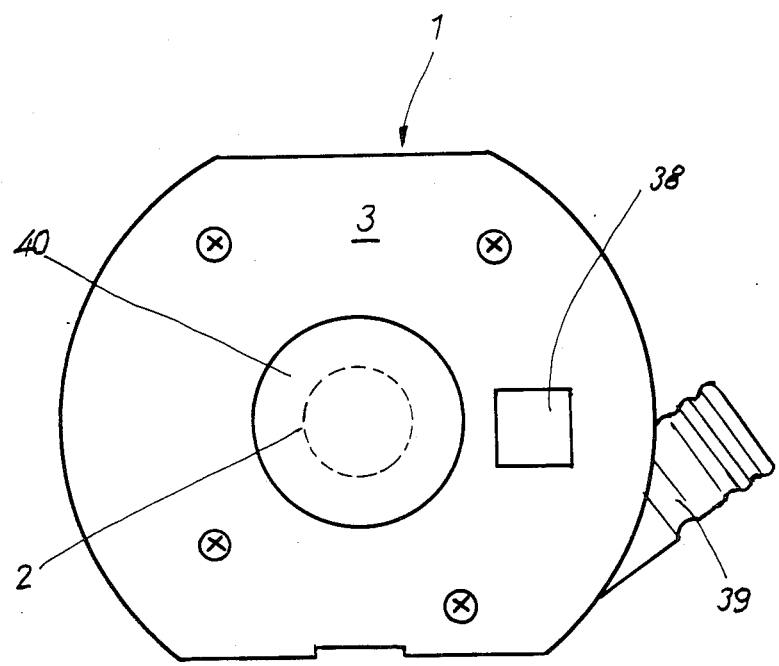
FIG. 5 shows the lower side of a support guide of the router tool.

If the support guide 1 is constructed in the form of a hollow body, though which the dust is aspirated, it is possible to have have an opening 38 in the support surface 3, which in the normal working positions of the stop and the chip collecting hood 19 is aligned with the ramp 28 and with the passage opening 32 in the stop (see FIG. 5). The chips to be aspirated make their way through this opening into the support guide 1 and they are guided through the cavity in the support guide 1 as far as the aspiration or vacuum connector 39. FIG. 5 shows the opening 40 through the support guide, through which the bit 2 extends. As already noted, the part of the support guide 1 adjacent to the opening is open towards the bit 2 and is open for at least part of its circumference so that the aspirating air current will be effective on the bit as well.

It is lastly to be noted that the router tool may also be operated with the stop in the position shown in FIG. 1, in which the chip collecting hood 19 is at a considerable distance from the bit and does not encompass it. The chip collecting hood 19 is then however generally nonoperative.

We claim:

1. A routing tool comprising a support guide for supporting said tool on a workpiece, a routing bit to be rotated by said tool, said bit extending through an opening in said guide, a dust aspirating means, means for collecting chips, said dust aspirating means being placed at a height at least on a level with the supporting guide, said chip collecting means including a hood mounted on said supporting guide and at a lower level than said supporting guide and having a wall extending approximately circumferentially around part of a circumference of said bit and furthermore said load having a floor in the form of a ramp inclined at such an angle in relation to an axis of rotation of said bit that chips thrown from said bit are deflected upwards by the ramp and removed by said aspirating means.

2. The routing tool as claimed in claim 1 further comprising a support plate having an edge to which said wall is adjacent so that the said chip collecting hood opens towards this edge and the part, encompassed by the wall, of the chip collecting hood is open at the level of the support plate.

3. The routing tool as claimed in claim 1 wherein the chip collecting hood is mounted so as to be able to be adjusted in a direction perpendicular to the axis of the bit.

4. The routing tool as claimed in claim 3 comprising a stop for guiding motion of said tool in relation to said workpiece, means mounting said chip collecting hood on the stop and means for adjusting the distance between said bit and said stop.

5. The routing tool as claimed in claim 4 wherein said chip collecting hood is slidingly mounted on the stop.

6. The routing tool as claim in claim 5 wherein the said stop is generally L-shaped and includes a base plate extending parallel to the support guide and a flange extending at a right angle thereto and parallel to said bit axis, said support plate of the chip collecting hood resting against a lower side of said base plate and being mounted thereon by means guaranteeing a running fit between said support and base plates, said stop having a cutout for accommodating said bit.

7. The routing tool as claimed in claim 6 wherein said support plate is mounted on said base plate by means of two rails, said base plate having a cutout therein opening to the side.

8. The routing tool as claim in claim 7 wherein said stop has a passage opening over the ramp for chips that are to be removed.

9. The routing tool as claimed in/claim 8 wherein said passage opening is made in the base plate and the flange of the stop, it extending for part of the height of the flange.

10. The routing tool as claimed in claim 9 wherein said passage opening is bordered by a straight front edge adjacent to workpiece engagement by said bit and a curved back edge corresponding to the wall of the chip collecting hood.

* * * * *